INVENTOR
Joseph C. Thornwall

United States Patent Office 3,532,948
Patented Oct. 6, 1970

3,532,948
STEPPING MOTOR CONTROL CIRCUIT
Joseph C. Thornwall, Potomac, Md., assignor to the United States of America as represented by the Administrator of the National Aeronautics and Space Administration
Filed Oct. 29, 1968, Ser. No. 771,523
Int. Cl. H02p 7/28
U.S. Cl. 318—138         15 Claims

ABSTRACT OF THE DISCLOSURE

This disclosure describes an apparatus for converting a DC voltage into a bi-polar voltage having the amplitude and number of phases necessary to simultaneously excite the windings of a stepping motor in the proper time sequence to cause the motor to rotate in either direction. A core array module "remembers" the prior direction of rotation of the motor. A plurality of flip-flops in combination with a blocking oscillator, a differential amplifier and a plurality of gates control the application of power through an amplifier and switching means to the motor windings. By applying step pulses to the blocking oscillator and directional pulses to one of the flip-flops, the motor is made to move in one direction or the other.

This invention described herein was made by an employee of the United States Government and may be manufactured and used by or for the Government for governmental purposes without the payment of any royalties thereon or therefor.

BACKGROUND OF THE INVENTION

Stepping motors have found widespread use in various environments. They are used to control the movement of plural contacts in switches so that various predetermined circuit connections can be made. Stepping motors are also used to control various mechanical movements in machines. In addition, stepping motors are used on board space vehicles to perform many functions, such as pointing a telescope or moving a spectrometer, for example.

Various prior art means have been proposed and are in use for controlling the stepping action of stepping motors. The most widely used prior art means excite each winding of the stepping motor in sequence directly from a DC power source. The primary disadvantage of this means is that it makes inefficient use of the motor windings. In addition, the stepping motor must be specially wound if the DC voltage source is on standard DC voltage source. A further disadvantage of this type of prior art means is that large peak currents flow because the motors are generally operated by low voltage level amplifiers. Moreover, the peak currents usually flow in unbalanced common return lines during the excitation of the motor windings and introduce noise into the amplifiers. Noise may cause erroneous motor stepping action. Further, because a direct connection between the DC voltage source and the windings is used, there is no way to obtain conductive isolation between the low level input signal to the motor control circuit and the output power applied to the motor. And, without isolation, the low level circuits in the overall system are vulnerable to noise from the power bus and the common power return.

Therefore, it is an object of this invention to provide a new and improved stepping motor control circuit.

It is also an object of this invention to provide a new and improved stepping motor control circuit wherein the windings of the motor are not directly connected to the DC power source.

It is a further object of this invention to provide a new and improved stepping motor control circuit wherein the DC voltage can vary over a predetermined range without adversely affecting the operation of the stepping motor.

It is another object of this invention to provide a new and improved stepping motor control circuit that has better noise immunity than prior art circuits.

It is a still further object of this invention to provide a stepping motor control circuit having isolation between the input signal to the control circuit and the output power applied to the motor.

SUMMARY OF THE INVENTION

In accordance with a principle of this invention, an apparatus for controlling a stepping motor is provided. The apparatus includes a core array module that senses and "remembers" the prior direction of motor movement. The apparatus also includes flip-flops for sensing the remembered state of the cores of the core array module and for sensing input signals. The flip-flops, through appropriate amplifying and gating means, control the application of power to the motor windings so that the motor steps forward or backward upon the receipt of appropriate directional and stepping pulses.

In accordance with another principle of this invention, the core array module includes a plurality of linear and a plurality of non-linear cores.

In accordance with a further principle of this invention, the flip-flops are connected so as to be immune from noise, thereby preventing noise from creating false stepping signals.

In accordance with yet another principle of this invention, bidirectional current is provided so that all motor windings may be driven simultaneously to allow the motor to operate in a forward or reverse direction from a uni-directional DC power supply.

It will be appreciated from the foregoing summary of the invention that an apparatus for controlling the direction of movement of a stepping motor that overcomes the problems of prior art apparatus is provided. The system has inherent reliability due to the use of magnetic logic and memory circuits in the form of a core array module. In addition, because the actual motor winding current is sensed to determine the state of the just prior motor excitation, i.e., the last direction of movement, a still more reliable system is provided. Further, because the system is isolated, coupling from adjacent circuits in an overall system is reduced. Furthermore, the invention operats so as to use a non standard DC voltage source to control a standard stepping motor. This flexibility is provided without sacrificing efficiency in the voltage conversion necessary for motor operation. In addition, the system provides immediate motor reversal upon the application of the first stepping pulse following a change in direction input.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figures 1A, 2:
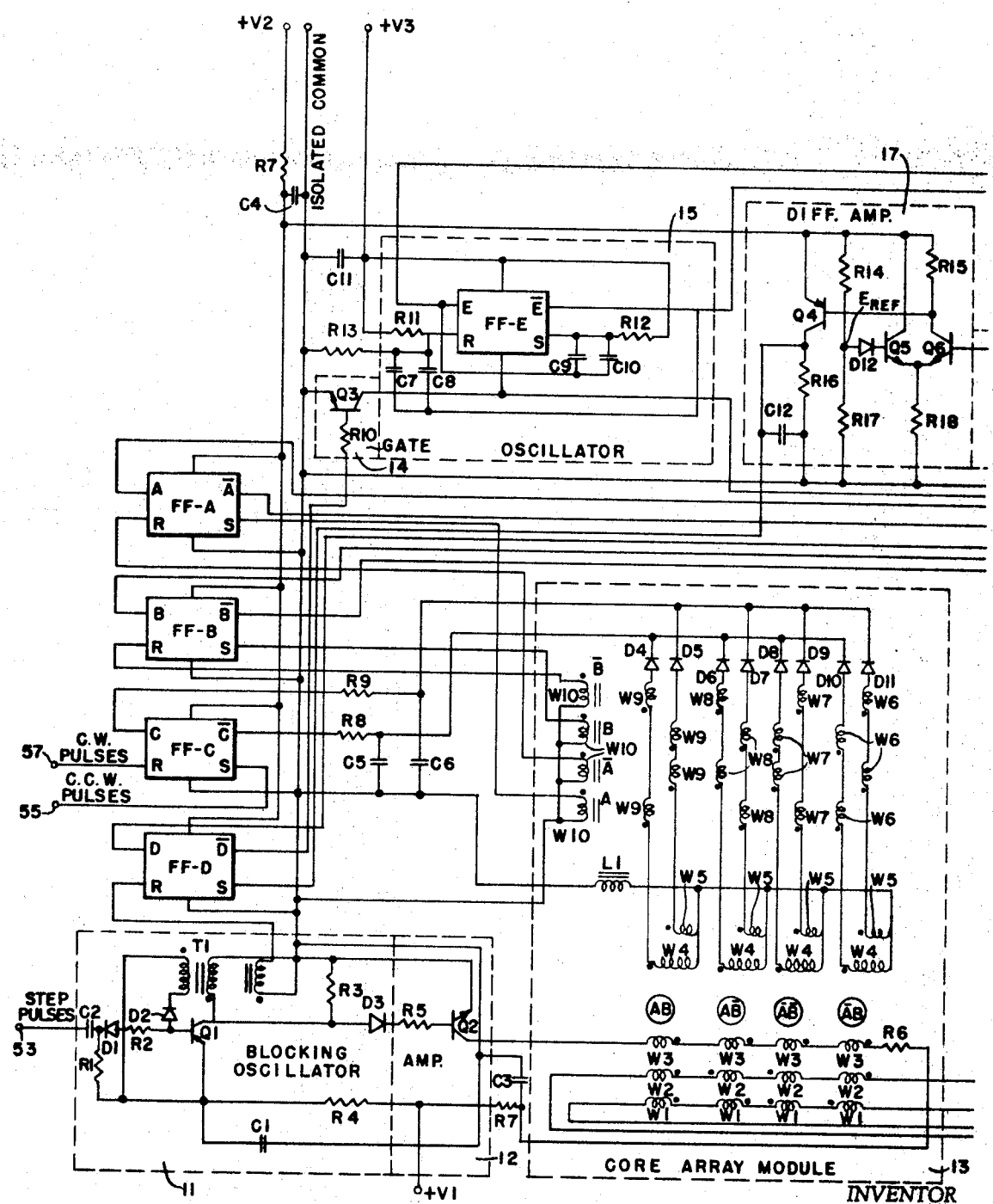
FIGS. 1a and 1b illustrate a partially block and partially schematic diagram of a preferred embodiment of the invention.
FIG. 2 is a legend for FIGS. 1a and 1b.
Figure 1B:
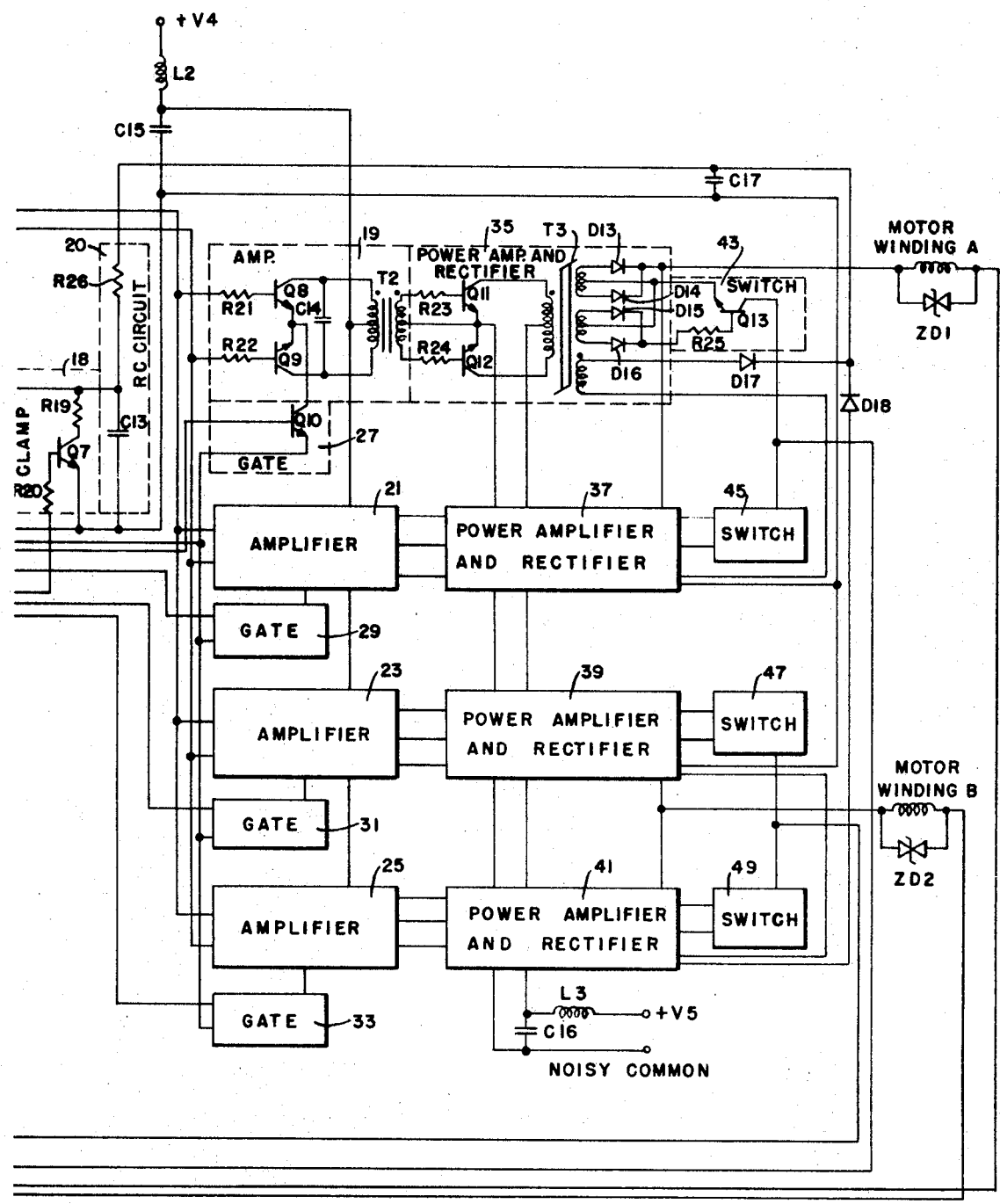

FIGS. 1a and 1b illustrate a preferred embodiment of the invention and comprise: a blocking oscillator 11; a first amplifier 12; a core array module 13; a first gate 14; an oscillator 15; a differential amplifier 17; a clamp 18; second, third, fourth, and fifth amplifiers 19, 21, 23, and 25; second, third, fourth, and fifth gates 27, 29, 31, and 33; first, second, third, and fourth power amplifiers and rectifiers 35, 37, 39, and 41; first, second, third, and fourth switches 43, 45, 47, and 49; and four flip-flops designated FF–A, FF–B, FF–C, and FF–D.

The blocking oscillator 11 comprises: a PNP transistor designated Q1; three diodes designated D1, D2 and D3; a first capacitor designated C1; a first transformer designated T1; a second capacitor designated C2; and four resistors designated R1, R2, R3 and R4. T1 has a single primary winding and a pair of secondary windings. It should be noted here that conventional dot terminology is used to describe the connections to the transformers and the cores of the core array module used by the invention and herein described.

An input terminal 53 adapted to receive motor step pulses is connected through C2 to the cathode D1. The anode of D1 is connected through R2 to the base of Q1 and to the anode of D2. The junction between C2 and D1 is connected through R1 to the emitter of Q1. The dot end of the first secondary winding of T1 is connected to the emitter of Q1 and the non-dot end of the first secondary winding T1 is connected to the cathode of D2. The collector of Q1 is connected to the dot end of the primary winding of T1 and the other end of the primary winding is connected to the dot end of the second secondary winding. The other end of the primary winding is also connected through R3 to the anode of D3. The emitter of Q1 is connected to one end of R4 and to one end of C1. The collector of Q1 is also connected to the anode of D3.

The core array module 13 comprises four non-linear cores designated AB, A$\bar{B}$, $\bar{A}$B, and $\bar{A}\bar{B}$; four linear cores designated $\bar{B}$, B, $\bar{A}$, and A; fourth, fifth, sixth, seventh, eighth, ninth, tenth and eleventh diodes designated D4, D5, D6, D7, D8, D9, D10, and D11; a choke designated L1; and a resistor designated R6. Each non-linear core includes five windings designated W1, W2, W3, W4 and W5. Each linear core includes five windings designated W6, W7, W8, W9, and W10.

The collector of Q2 is connected to the non-dot end of W3 of AB. The dot end of W3 of AB is connected to the non-dot end of W3 of A$\bar{B}$ and the dot end of W3 of A$\bar{B}$ is connected to the non-dot end of W3 of $\bar{A}$B. The dot end of W3 of $\bar{A}$B is connected to the non-dot end of W3 of $\bar{A}\bar{B}$. The dot end of W3 of $\bar{A}\bar{B}$ is connected through R6 in series with a seventh resistor designated R7 to the other end of R4. The junction between R4 and R7 is connected to a first voltage source designated +V1. The junction between R6 and R7 is connected through a third capacitor designated C3 to the other end of C1. The junction between C1 and C3 is connected to the dot end of the second secondary winding of T1. The dot end of the second secondary winding of T1 is also connected to the non-dot end of the primary winding of T1 and to an isolated common line.

The non-dot ends of W4 and W5 of AB, A$\bar{B}$, $\bar{A}$B, $\bar{A}\bar{B}$ are all connected together and to one end of L1. The dot end of W4 of AB is connected to the dot end of W9 of A; and, the non-dot end of W9 of A is connected to the dot end of W9 of $\bar{B}$, the non-dot end of W9 of $\bar{B}$ is connected to the anode of D4. The dot end of W5 of AB is connected to the dot end of W9 of $\bar{A}$; and, the non-dot end of W9 of $\bar{A}$ is connected to the dot end of W9 of B. The non-dot end of W9 of B is connected to the anode of D5.

The dot end of W4 of A$\bar{B}$ is connected to the dot end of W8 of $\bar{A}$; and, the non-dot end of W8 of $\bar{A}$ is connected to the dot end of W8 of $\bar{B}$. The non-dot end of W8 of $\bar{B}$ is connected to the anode of D6. The dot end of W5 of A$\bar{B}$ is connected to the dot end of W8 of A. The non-dot end of W8 of A is connected to the dot end of W8 of B; and, the non-dot end of W8 of B is connected to the anode of D7.

The dot end of W4 of $\bar{A}$B is connected to the dot end of W7 of $\bar{A}$. The non-dot end of W7 of $\bar{A}$ is connected to the dot end of W7 of B; and, the non-dot end of W7 of B is connected to the anode of D8. The dot end of W5 of $\bar{A}$B is connected to the dot end of W7 of A. The non-dot end of W7 of A is connected to the dot end of W7 of $\bar{B}$. The non-dot end of W7 of $\bar{B}$ is connected to the anode of D9.

The dot end of W4 of $\bar{A}\bar{B}$ is connected to the dot end of W6 of A. The non-dot end of W6 of A is connected to the dot end of W6 of B; and, the non-dot end of W6 of B is connected to the anode of D10. The dot end of W5 of $\bar{A}\bar{B}$ is connected to the dot end of W6 of $\bar{A}$. The non-dot end of W6 of $\bar{A}$ is connected to the dot end of W6 of $\bar{B}$. The non-dot end of W6 of $\bar{B}$ is connected to the anode of D11.

FF–A, FF–B, FF–C and FF–D all have one input connected to the isolated common and a second input connected through a resistor designated R7 to a second voltage source designated +V2. Connected between +V2 and the isolated common is a fourth capacitor designated C4. The non-dot ends of W10 on A, $\bar{A}$, B and $\bar{B}$ are all connected together and to the isolated common. The other end of L1 is also connected to the isolated common.

The dot end of W10 of A is connected to the set input of FF–A and the dot end of W10 of $\bar{A}$ is connected to the reset of FF–A. The dot end of W10 of B is connected to the set input of FF–B and the dot end of W10 of $\bar{B}$ is connected to the reset input of FF–B. The set input of FF–C is connected to a first directional input terminal 55 that is adapted to receive a pulse or voltage level that will cause the motor to rotate in one direction, counter clockwise (c.c.w.) for example. The reset input of FF–C is connected to a second directional input terminal 57 that is adapted to receive a pulse or voltage level that will cause the motor to rotate in the other direction, clockwise (c.w.), for example. Hence, directional input signals are supplied to FF–C to control the direction of motor stepping thereby making FF–C the directional control flip-flop.

The cathodes of D4, D6, D8 and D10 are all connected together and through a resistor designated R8 to the $\bar{C}$ output of FF–C. The cathodes of D5, D7, D9 and D11 are connected through a resistor designated R9 to the C output of FF–C. A fifth capacitor designated C5 is connected between the junction of R8 and the cathodes of D4, D6, D8 and D10, and the isolated common. A sixth capacitor designated C6 is connected between the junction of R9 and the cathodes of D5, D7, D9, and D11, and the isolated common.

The first gate 14 comprises an NPN transistor designated Q3 and a resistor designated R10. The base of Q3 is connected through R10 to the $\bar{D}$ output of FF–D. The emitter of Q3 is connected to the isolated common.

The oscillator 15 comprises a fifth flip-flop designated FF–E; four capacitors designated C7, C8, C9, and C10; and, two resistors designated R11 and R12.

One power input of FF–E is connected to a third voltage source designated +V3. +V3 is connected to the isolated common through an eleventh capacitor designated C11. The other power input of FF–E is connected to the collector of Q3. +V3 is connected through R11 into the reset input of FF–E. The reset input of FF–E is connected through C7 in parallel with C8 to the $\bar{E}$ output of FF–E. The reset input of FF–E is also connected through a thirteenth resistor designated R13 to the isolated common. +V3 is also connected through R12 to the set input of FF–E. The set input of FF–E is connected through C9 in parallel with C10 to the E output of FF–E.

The differential amplifier 17 comprises a PNP transistor designated Q4; two NPN transistors designated Q5 and Q6; a diode designated D12; a capacitor designated C12; and, five resistors designated R14, R15, R16, R17, and R18. The collector of Q4 is connected to the set input of FF–D. The collector of Q4 is also connected through R16 in parallel with C12 to the isolated common. The emitter of Q4 is connected through R7 to +V2. The base of Q4 is connected to the collector of Q6. The emitters of Q5 and Q6 are connected together and through R18 to the isolated common. The emitter of Q4 is connected through R14 in series with R17 to the isolated common. The junction between R14 and R17 is a reference point and is connected through D12 to the base of Q5. The collector of Q5 is connected to the emitter of Q4 and the collection of Q6 is connected through R15 to the emitter of Q4.

The clamp 18 comprises: a NPN transistor designated Q7; and, two resistors designated R19 and R20. The base of Q7 is connected through R20 to the D output of FF–D. The emitter of Q7 is connected to the isolated common; and, the collector of Q7 is connected through R19 to the base of Q6.

The RC circuit 20 comprises a resistor designated R26 and a capacitor designated C13. C13 is connected in parallel with R19 and the emitter-collector junction of Q7. The junction between C13 and R19 is connected to one end of R26.

For ease of illustration, only the second of the second, third, fourth, and fifth amplifiers 19, 21, 23, and 25 is shown in schematic form in the figure. Similarly, only the second, of the second, third, fourth, and fifth gates 27, 29, 31 and 33 is illustrated in schematic form. In addition, only the first of the first, second, third and fourth power amplifier and rectifiers 35, 37, 39 and 41 and only the first of the first, second, third and fourth switches 43, 45, 47 and 49 is illustrated in schematic form.

Each of the second, third, fourth and fifth amplifiers comprises: a pair of NPN transistors designated Q8 and Q9; a transformer designated T2; a capacitor designated C14; and, a pair of resistors designated R21 and R22. The E output of FF–E is connected through R21 to the base of Q8 and the $\overline{E}$ output of FF–E is connected through R22 to the base of Q9. The collector of Q8 is connected through C14 to the collector of Q9. The collector of Q8 is also connected to the dot end of the primary winding of T2; and, the collector of Q9 is connected to the non-dot end of the primary winding of T2. A center tap of the primary winding of T2 is connected through L2 to a fourth voltage source designated +V4 and through a capacitor designated C15 to the isolated common.

Each of the second, third, fourth and fifth gates comprise an NPN transistor designated Q10. The emitter of Q10 is connected to the collector of Q3; and, the collector of Q10 is connected to the emitters of Q8 and Q9. The base of Q10 of the second gate 27 is connected to the A output of FF–A. The base of Q10 of the third gate 29 is connected to the $\overline{A}$ output of FF–A. The base of Q10 of the fourth gate 31 is connected to the B output of FF–B. And, the base of Q10 of the fifth gate 33 is connected to the $\overline{B}$ output of FF–B.

Each of the four power amplifier and rectifiers comprise: two NPN transistors designated Q11 and Q12; a saturable core transformer designated T3; four diodes designated D13, D14, D15, and D16; and, two resistors designated R23 and R24. The dot end of the secondary winding of T2 is connected through R23 to the base Q11. The non-dot end of the secondary winding of T2 is connected through R24 to the base of Q12. The center tap of the secondary winding of T2 is connected to the emitters of Q10 and Q11 and to a noisy common. The noisy common is connected through a capacitor designated C16 and an inductor designated L3 to a fifth voltage source designated +V5. The junction between L3 and C16 is connected to the center tap of the primary winding of T3. The dot end of the primary winding T3 is connected to the collector of Q11 and the non-dot end of the primary winding of Q3 is connected to the collector of Q12.

T3 has three secondary windings. The ends of the first secondary winding of T3 are connected to the anodes of D13 and D14, respectively. The cathodes of D13 and D14 are connected together. The ends of the second secondary winding of T3 are connected to the anodes of D15 and D16, respectively. The cathodes of D15 and D16 are connected together.

Each of the four switches comprises an NPN transistor designated Q13 and a resistor designated R25. The center tap of the first and second secondary windings of T3 are connected together and to the emitter of Q13. The base of Q13 is connected through R25 to the cathodes of D15 and D16.

The collectors of Q13 of the first and second switches 43 and 45 are connected together and to the non-dot end of W1 of $\overline{AB}$. The dot end of W1 of $\overline{AB}$ is connected to the non-dot of W1 of $\overline{AB}$ and the dot end of W1 of $\overline{AB}$ is connected to the dot of W1 of $A\overline{B}$. The non-dot end of W1 of $A\overline{B}$ is connected to the dot end of W1 of AB. The non-dot end of W1 of AB is connected to one end of a first winding, designated winding A, of a stepping motor. The other end of winding A of the stepping motor is connected to the cathodes of D13 and D14 of the first and second power amplifier and rectifiers 35 and 37.

The collectors of Q13 of the third and fourth switches 47 and 49 are connected together and to the dot end of W2 of $\overline{AB}$. The non-dot end of W2 of $\overline{AB}$ is connected to the non-dot end of W2 of $\overline{AB}$. The dot end of W2 of $\overline{AB}$ is connected to the non-dot end of W2 of $A\overline{B}$. The dot end of W2 of $A\overline{B}$ is connected to the dot end of W2 of AB. The non-dot end of W2 of AB is connected to one end of a second winding, designated winding B, of the stepping motor. The other end of winding B of the stepping motor is connected to the cathodes of diodes D13 and D14 of the third and fourth power amplifier and rectifiers 39 and 41.

The third secondary winding of T3 of the first and second power amplifier and rectifiers 35 and 37 are connected in series. One end of the series connection is connected to the isolated common. The other end of the series connection is connected through a diode designated D17 to the other end of R26. The third secondary winding of T3 of the third and fourth power amplifier and rectifiers 39 and 41 are connected in series. One end of the series connection is connected to the isolated common and the other end is connected through a diode designated D18 to the other end of R26. The cathodes of D17 and D18 are connected through a capacitor designated C17 to the isolated common. Double Zener diodes ZD1 and ZD2 are connected in parallel with motor windings A and B, respectively.

Turning now to a description of the operation of the invention, in order to excite all of the windings of a stepping motor at each step, a bi-directional current must be provided to each winding in the proper sequence. If, as illustrated in the figure, the motor has two windings, one labeled A and the other labeled B, a current pulse in one direction is labeled $I_A$ and $I_B$, and a current pulse in the other direction is labeled $\bar{I}_A$ and $\bar{I}_B$. Then the motor will rotate in one direction when the following repeated sequence of pulses is applied to the windings: $I_A\bar{I}_B$, $I_AI_B$, $\bar{I}_AI_B$, $\bar{I}_A\bar{I}_B$. The direction of rotation is reversed by pulsing the windings with the current direction that has just been applied to place the motor in the present position. And, the repeated application of pulses in the opposite sequence causes the motor to rotate in the opposite direction. For example, if the motor has just moved to the rest position after the application of $I_AI_B$ pulses, it will return to the previous position if $I_A\bar{I}_B$ pulses are applied, or will step to the next position in the same direction if $\bar{I}_AI_B$ pulses are applied.

The four non-linear and the four linear cores of the core array module 13 of the figure sense and store the direction of current applied to the windings of the motor, in a first cycle of operation, and provide the signals necessary to control the direction of currents required to step the motor in the next cycle of operation. As previously discussed, the non-linear cores are designated AB, $\overline{A}$B, A$\overline{B}$, and $\overline{AB}$. A letter without a bar (—) over it represents one current direction and a letter with a bar over it represents the other current direction. The linear cores are designated A, $\overline{A}$, B, and $\overline{B}$ where the bar and the non-bar represents the set and the reset inputs to flip-flops A and B as herein described.

The W1 and W2 windings are connected as hereinabove described to the motor windings to sense the current flow through those windings. The W3 winding is used to readout the cores and the W4 and W5 windings of the non-linear cores are used to produce signals for switching the linear cores. W6 through W9 are the input windings of the linear cores and sense the state of the non-linear cores and, the W10 winding is the readout winding of the linear cores and control the FF–A and FF–B output states. As an example of the number of turns of the various windings in an operative embodiment of the invention, the W1, W2 and W6 through W9 windings each have four turns. The W3 windings have five turns. The W4 and W5 windings have 30 turns; and, the W10 windings have 42 turns.

The number of turns on the W1 and W2 windings of the non-linear cores are chosen to switch all of the flux in one core with the sum of the two motor winding currents. The foregoing operative embodiment required each winding to have 30 milliamperes so that a total of 240 milliampere-turns is on the selected core. This amount of excitation switched the cores in about 5 microseconds.

The core array module 13 of the embodiment of the invention illustrated in the figure operates in the following manner: first assume that the motor has been driven on the preceding step and one of the four current combinations was applied to the A and B motor windings. Further, assume that the currents through the W1 and W2 windings were from the left to the right as the windings are illustrated in the figure. Under these conditions there is an excitation of 240 milliampere turns into the non-dot ends of the windings on core AB, a net excitation of 0 on cores $\overline{A}$B and A$\overline{B}$ and a net excitation of 240 milliampere turns into the dot ends of the windings on core $\overline{AB}$.

This particular current combination only switches core AB to the proper remanent state to produce an output signal when a readout impulse is applied to the W3 windings. The flux in the other cores remain in the same remanent state as that produced by the W3 readout winding.

It will be understood from the example set forth in the preceding paragraph that for the other three possible current combinations, the flux in only one core switches for each combination. Hence, the core array module effectively stores motor current polarity information in one of the four non-linear cores. The selected core remains in its state of information storage indefinitely, ready to be switched when the next readout pulse is applied to the W3 windings.

When a readout pulse appears on the W3 windings, the previously selected core switches and a pulse is produced on the W4 and W5 output windings on that core. This pulse causes a current flow in one of the two lines, i.e., W4 or W5. The line selected is determined by the state of FF–C at the time of the readout. For example, if core AB is switched, there is a choice of producing outputs on linear cores $\overline{A}$ and B or A and $\overline{B}$, depending upon the desired direction of motor rotation. The direction of motor rotation is determined by the condition of FF–C. That is, FF–C controls the charge on C5 and C6 which in turn controls the flow through W4 or W5 due to the passage of current through the diodes D4 and D5 for the AB switching condition. The other non-linear core outputs operate in a similar manner to place FF–A and FF–B in the proper states to rotate the motor one step in either direction.

The choke L1 limits the current that flows when the noise flux switches in the three unselected non-linear cores during the readout interval. Preferably, the value of this inductor is chosen to be just large enough to present a high impedance load to all of the unselected cores during the noise flux switching interval but, small enough not to effect the switching of the total flux in the selected core. The use of the choke results in a greatly reduced amplitude of noise voltage on the outputs of the linear cores. For example, it has been found that the signal and noise pulse outputs from the linear core measured six volts, 1.0 microsecond and 0.5 volt, 0.4 microsecond, respectively, with the choke. The noise voltage was 2 volts, 0.5 microsecond without the choke.

In the actual embodiment of the invention previously discussed, the non-linear cores were formed of commercially available 0.000125 in. thick Mo-permalloy tape wound on a stainless steel bobbin toroid core measuring 0.2 in. outside diameter and 0.094 in. inside diameter and 0.105 in. high, exhibiting a total flux ($-B_r$ to $+B_m$) of 22 maxwells with a noise flux of less than 4% of this value. All of the flux in a core of this nature switches in 10 microseconds with an excitation of 150 milliampere-turns. For the same embodiment, the four linear cores were formed of commercially available 0.0005 in. thick Mo-permalloy tape wound on a stainless steel bobbin toroid core measuring 0.2 in. outside diameter, 0.094 in. inside diameter and 0.105 in. high exhibiting a total noise flux ($B_r$ to $B_m$) maxwells. All of the flux in a core of this nature switches in 1.0 microsecond with an excitation of 240 milliampere-turns.

The system illustrated in FIGS. 1a and 1b operates in the following manner: when power is applied FF–A, FF–B, and FF–C come up in one or the other of their two states. Thereafter, FF–C is pulsed by applying a pulse to either input terminal 55 or 57 to give a desired rotational direction. Then, a step pulse is applied to the motor stepping input terminal 53 which triggers the blocking oscillator 11 and the first amplifier 12. For the foregoing example of winding turns and energy levels for the core array module, the input step pulse triggers the blocking oscillator 11 and first amplifier 12 "on" for 5 microseconds. The output of the first amplifier 12 switches one of the cores in the non-linear array that was previously switched by the pulse currents through the motor windings during the preceding step of the motor as hereinabove described. Switching that core produces an output on two of the four linear cores (the pair selected depends upon the state of FF–C) and places FF–A and FF–B into the required states to produce the proper voltage polarities necessary for the motor windings to create the desired direction of rotation. At the end of the five microseconds, FF–D, which is a motor drive pulse width control flip-flop is reset.

Resetting of FF–D causes the first gate 14 to open which starts the oscillator and applies an input signal to the second, third, fourth, and fifth amplifiers 19, 21, 23, and 25. Opening of the first gate 14 also furnishes a DC bias to the second, third, fourth and fifth gates 27, 29, 31 and 33. Two of the second through fifth amplifiers are gated on by the combined outputs of the first gate 14 and FF–A and FF–B. The output of these amplifiers is amplified and rectified by the appropriate power amplifier and rectifiers. The power amplifier and rectifiers drive the transistor switches so that voltages of given polarities are applied to the motor windings A and B.

The excitation of winding A and winding B causes the motor to step and, at the same time, switches current through the W1 and W2 windings of the non-linear cores in the core array module. The current flow through the W1 and W2 windings identifies which one of the four possible pulse combinations has just been applied to the motor. This pulse combination is stored in the manner heretofore discussed. The stored information is used to switch two of the four linear cores in the core array module to set up FF–A and FF–B when the cycle is repeated for the next motor step. The particular pair of linear cores that are switched when the next step occurs depends upon the state of the motor direction flip-flop FF–C at the time of application of that step pulse.

The duration of the motor excitation pulse depends primarily on the time constant of RC circuit 20, the magnitude of the reference voltage at the junction between R14 and R17 and the magnitude of the +V5 source. Rectifiers D17 and D18 provide a feedback voltage to RC circuit 20 comprising R26 and C13. As the feedback voltage increases, C13 charges to the comparison voltage more quickly and results in a shortening of the duration of the motor excitation pulse. For example, the circuit may be set up initially so that the motor steps properly with a +V5 voltage of 16 volts. Then, as this voltage increases, the motor drive pulse width decreases linearly to provide a means of maintaining a constant energy input to the motor. The clamp 18 connected to RC circuit 20 returns the voltage across the capacitor to zero at the end of each drive pulse. Hence, the clamp establishes the same reference voltage at the beginning of each time interval, regardless of the stepping rate.

It will be appreciated from the foregoing description that the invention operates from a power source (+V5) that may vary over a wide range, for example, 16 to 22 volts. Even though it varies over this range, the energy input to the motor maintains constant level thereby allowing the motor to be used efficiently.

Preferably, in the example of an actual embodiment of the invention heretofore discussed, the isolated power supplies (i.e., +V1, +V2, +V3, and +V4) are 5 volts. Of course, any voltage that is compatible with the choice of resistors, capacitors and transistors could be used. The power amplifier and rectifiers operate from the noisy +V5 power supply (i.e., the one that fluctuates over a range, such as 16 to 22 volts, for example). In order to maintain the isolation of the 5 volt supplies, it is preferred to trigger the blocking oscillator 11 and the set and reset inputs of FF–C through isolation transformers, especially if these signals are to be conducted over a long distance.

The second, third, fourth and fifth gates controlling the second, third, fourth and fifth amplifiers are, as illustrated and heretofore described, made up of transistors with their emitters connected together and returned through the first gate consisting of Q3. This manner of connection places the common emitter return of the amplifier transistors Q8 and Q9 through the collector to emitter resistance of two transistors in series. If a 50 kHz. signal is generated by the oscillator and applied to the base of the amplifier transistors, it will not appear across the T2 primary winding unless both of the series-connected gate transistors Q3 and Q10 are on. Because the oscillator common return is also connected to the collector of Q3, power required by the oscillator, gates and amplifiers is only consumed when it is needed, i.e., during the duration of the motor pulse.

T2 serves to conductively isolate the +V1 through +V4 sources from the noisy common and to impedence match the oscillator signal from the amplifier stages to the power amplifier portion of the power amplifiers and rectifiers. In order to minimize the capacitive coupling between the windings of these transformers, the secondary winding is preferably segment-wound from the primary windings. This method of construction eliminates most of the stray coupling between the windings, however, there may still be a very small differentiated signal present in the secondary winding even with the gate transistor off. This signal, if it exists, is caused by the fast rise and fall time of the oscillator square wave appearing across the primary and coupling through the small remaining primary to secondary capacitance. This signal is eliminated by lengthening the rise and fall time of the oscillator square wave with C–14.

The following is a description of a single step of motor operation. The step is described by tracing the sequence of events from the application of the motor stepping input pulse at terminal 53 to the termination of the motor excitation pulse width. A step pulse is applied to the blocking oscillator input terminal 53 and causes Q1 to conduct until the core of T1 saturates. This period may be 5 microseconds, for example. When Q1 conducts, it applies a positive signal to the base of Q2 which causes Q2 to conduct and connect the W3 windings of the core array module to the isolated common return. If it is assumed that the motor has been pulsed on the preceding step with currents in the W2 windings from right to left and the W1 windings from left to right, the flux in the core of $A\overline{B}$ has been reset. When the W3 windings are connected to the isolated common through Q2, a current flows from the positive of C3 through the W3 windings and back to the isolated common. The flux in the core of $A\overline{B}$ switches and a voltage appears across the W4 and W5 windings of $A\overline{B}$.

Either W4 or W5 energizes two of the W8 windings, depending upon the desired motor direction. If it is assumed that FF–C is in the appropriate state to reverse bias D7, then D6 is zero biased and a pulse of current flows in the W8 windings of $\overline{A}$ and $\overline{B}$. This current causes a voltage to be produced on the output windings of $\overline{A}$ and $\overline{B}$, i.e., on the W10 windings of the $\overline{A}$ and $\overline{B}$ linear cores. Hence, FF–A and FF–B are reset. Resetting FF–A and FF–B causes the $\overline{A}$ and $\overline{B}$ outputs of these flip-flops to become positive and Q10 of gate 29 and Q10 of gate 33 to turn on. Preferably, all of the foregoing operations occur during the first microsecond of the 5 microsecond operation of the blocking oscillator pulse.

At the end of the 5 microseconds, the overshoot of the blocking oscillator causes FF–D to be reset and $\overline{D}$ becomes positive. When $\overline{D}$ becomes positive, the first gate transistor Q3 conducts and connects the return of the oscillator to the isolated common and returns the emitters of Q10 of the other gates to the isolated common. This operation applies an oscillator signal to the input of the second, third, fourth and fifth amplifiers, however, only the third and fifth amplifiers respond because only their Q8 and Q9 transistors are returned to the isolated common. The third and fifth amplifiers drive their respective amplifiers and rectifiers so that an oscillator frequency square wave voltage appears on the secondaries of their saturable transformers T3. This voltage is rectified by diodes D13 and D14 to provide a negative DC voltage to the sides of windings A and B to which these diodes are connected. Diodes D15 and D16 supply a negative voltage between the emitter and the base of switch transistors Q13 which turns these transistors on and connects a positive polarity voltage through the W1 and W2 windings of the core array module and through the center taped primaries back to the other terminals of winding A and winding B. This connection results in the application of a DC voltage polarity to the motor windings and causes the motor to step.

The third secondary winding of T3 provides a square wave voltage that is rectified by D17 and D18 and applied as a voltage across the RC circuit 20.

The absolute value of this voltage depends upon the actual value of the +V5 voltage applied to the primary winding of the T3 transformers. C13 charges through R26 until the voltage across it rises to a value slightly larger than the reference voltage at the junction between R14 and R17. When this condition occurs, Q6 begins to conduct and Q4 is turned on. Turning on Q4 causes FF–D to be set which closes the first gate transistor Q3 to stop the oscillator and terminate the motor excitation. A positive voltage is applied to the base of Q7 when FF–D is set which discharges C13 in preparation for the next motor stepping pulse.

It will be appreciated that the time required for the voltage across C13 to reach the reference voltage level is a function of the feedback voltage, i.e., the higher this voltage, the shorter the time. This manner of operation results in the application of a relatively constant energy per step to the motor even though the +V5 voltage level varies. It is also obvious that the length of the pulse with a given power supply volage may be adjusted by changing the value of the reference voltage applied to the base of Q4. D12 is included in the circuit for temperature compensation, i.e., this diode changes the reference voltage in the same direction and amount as rectifier diodes D17 and D18 change the feedback voltage with ambient temperatures variations. ZD1 and ZD2 are included in the system to prevent transient voltages from occurring and destroying the transistor switches Q13.

In a preferred embodiment of the invention, a frequency of 50 kHz. was chosen for the oscillator frequency in order to be able to use small size transformers and keep the weight of the overall unit to a minimum. In that embodiment, the core of T2 is a ferrite toroid measuring 0.375 inch outside diameter, 0.188 inch inside diameter, and 0.125 inch thick. The core of T3 is a ½ mil thick Mo-permalloy tape wound on a stainless steel bobbin toroid measuring 0.320 inch outside diameter, 0.134 inch inside diameter and 0.160 inch thick. The efficiency of the overall circuit using items having the dimensions herein described operating from a 16 to 22 volt power supply was found to be 80%.

It will be appreciated from the foregoing description that the invention provides an apparatus for controlling the stepping of a stepping motor that has various advantages over prior art apparatus. For example, the apparatus has low stand-by power and conductive isolation between high and low voltage circuits. That is there is isolation between the high level +V5 circuits and the low level +V1 to +V4 circuits. In addition, constant energy pulse excitation can be applied over a wide range of +V5 voltages. Moreover, the circuit is inherently reliable due to the use of magnetic logic and memory circuits. Further, the invention distinguishes over the prior art because it uses the actual motor winding current to determine the phase of motor excitation, making the sensing and powering circuits integral rather than separate. In addition, balanced and isolated power excitation to the motor reduces noise coupling between adjacent circuits in an overall system that includes a stepping motor controlled by this invention. Finally, there is immediate reversal of motor direction upon the application of the first step pulse following a change in direction input pulse.

It will be appreciated by those skilled in the art and others that the foregoing has described a preferred embodiment of the invention, however, other embodiments of the invention fall within the scope of the description. For example, the invention could be extended to excite motors of any number of phases rather than just two phases. Motors with additional phases would be powered by changing the number of cores in the non-linear core array to include one core for each current combination. For example, an eight-phase motor could be controlled by adding two more amplifier and rectifier outputs, one additional flip-flop, two more linear and four more non-linear cores. All of the remaining circuits remain the same. In addition, the general concept herein disclosed could be used to power a brushless DC motor. For such a system additional means is necessary to sense the actual position of the motor to control the voltage polarity flip-flops through the core array to provide the proper phase excitation to the motor based on the actual position of the rotor of the motor at any given time. Hence, the invention can be practiced otherwise than as specifically described herein.

What is claimed is:

1. A stepping motor control circuit comprising:
    blocking oscillator means for generating an otuput signal upon the occurrence of an input pulse;
    core array module means adapted for connection to a stepping motor for sensing the current flow through the windings of said stepping motor, said core array module means also connected to the output of said blocking oscillator means;
    flip-flop means connected to said core array module means for sensing the status of said core array module means and connected to the output of said blocking oscillator means for sensing the output of said oscillator means;
    oscillator means connected to said flip-flop means for generating a signal when said flip-flop means is in a predetermined state;
    controllable amplifier means connected to said flip-flop means and to said oscillator means for generating an output signal when said oscillator means is generating a signal and when said flip-flop means is in a predetermined state; and
    power and switching means connected to said controllable amplifier means and adapted for connection to said motor windings for applying power to said motor windings when said controllable amplifier means is generating a signal.

2. A stepping motor control circuit as claimed in claim 1 wherein said core array module means includes a plurality of linear cores and a plurality of non-linear cores.

3. A stepping motor control circuit as claimed in claim 2 wherein said flip-flop means includes at least two flip-flops connected to said core array module means to sense the status of said core array module means and at least one flip-flop connected to said blocking oscillator means to sense when said blocking oscillator means is generating an output signal and at least one flip-flop connected to receive clockwise and counter clockwise directional pulses.

4. A stepping motor control circuit as claimed in claim 3 including a gate connected between the flip-flop sensing the output of said blocking oscillator means and said oscillator means.

5. A stepping motor control circuit as claimed in claim 4 wherein the sense windings of said non-linear cores of said core array module are connected to said motor windings and said blocking oscillator and wherein the readout windings of said non-linear cores are connected to said linear cores and wherein said linear cores are connected to said at least two flip-flops.

6. A stepping motor control circuit as claimed in claim 5 wherein said flip-flop receiving said clockwise and said counter clockwise pulses is connected to the readout windings of said non-linear cores to selectively control which readout windings of said cores are operable.

7. A stepping motor control circuit as claimed in claim 6 wherein said controllable amplifier means includes a plurality of amplifiers connected to the output of said oscillator and a plurality of gates selectively connected to the outputs of said at least two flip-flops.

8. A stepping motor control circuit as claimed in claim 7 wherein said power and switch means includes a plurality of power amplifier and rectifiers connected to the outputs of said plurality of amplifiers of said controllable amplifier means and a plurality of switches connected to the outputs of said power amplifier and rectifiers, and said switches selectively connected to said motor windings to control the application of power by said power amplifier and rectifier to said motor windings.

9. A stepping motor control circuit as claimed in claim 8 including:
    an RC circuit connected to said plurality of power amplifier and rectifiers to sense the signal from said power amplifier and rectifier;

a clamp connected to said RC circuit; and, a differential amplifier connected to said RC circuit and to said flip-flop connected to said blocking oscillator to turn off said flip-flop connected to said blocking oscillator when the capacitor of said RC circuit reaches a predetermined voltage level.

10. A stepping motor control circuit as claimed in claim 9 wherein each of said power amplifier and rectifiers includes an isolating transformer.

11. A stepping motor control circuit as claimed in claim 10 wherein said plurality of amplifiers is four amplifiers and wherein said plurality of gates is four gates.

12. A stepping motor control circuit as claimed in claim 11 wherein said plurality of amplifier and rectifiers is four power amplifiers and rectifiers, and said plurality of switches is four.

13. A stepping motor control circuit as claimed in claim 1 wherein said power and switching means includes power isolation means.

14. A stepping motor control circuit as claimed in claim 13 wherein said core array module means includes a plurality of linear cores and a plurality of non-linear cores.

15. A stepping motor control circuit as claimed in claim 14 wherein said flip-flop means includes at least two flip-flops connected to said core array module means to sense the status of said core array module means and at least one flip-flop connected to said blocking oscillator means to sense when said blocking oscillator means is generating an output signal and at least one flip-flop connected to receive clockwise and counter clockwise directional pulses.

References Cited

UNITED STATES PATENTS

| | | | |
|---|---|---|---|
| 3,304,480 | 2/1967 | Ko | 318—138 |
| 3,287,569 | 11/1966 | Carney | 318—138 XR |

GLEN SIMMONS, Primary Examiner